Dec. 19, 1950     E. J. PANISH     2,534,729
CONTROL DEVICE FOR PRIME MOVERS
Filed April 3, 1946     6 Sheets-Sheet 1
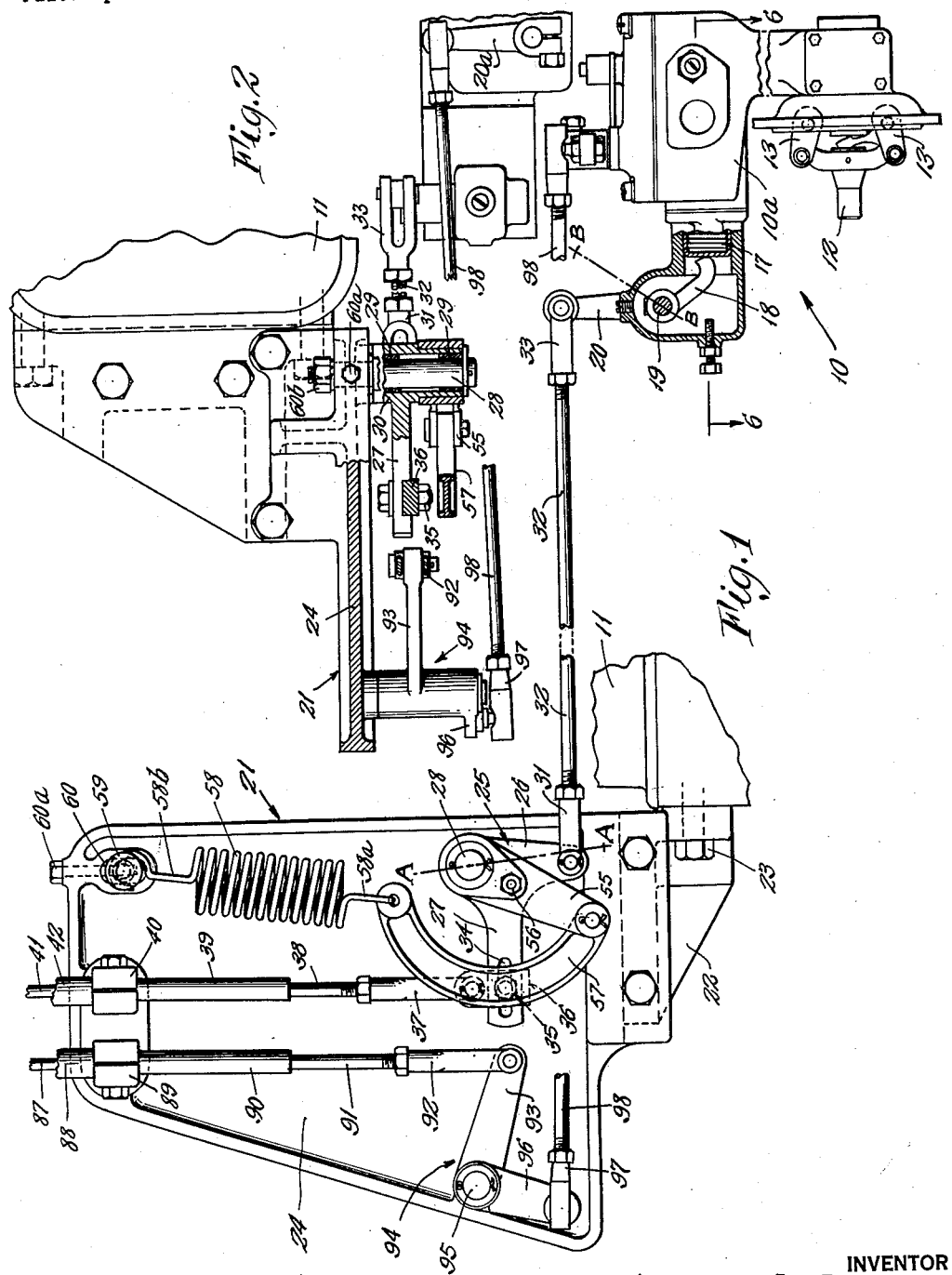
INVENTOR
*Erwin J. Panish*
BY
*Johnson, Kline and Hensel*
ATTORNEYS Dec. 19, 1950     E. J. PANISH     2,534,729
CONTROL DEVICE FOR PRIME MOVERS
Filed April 3, 1946     6 Sheets-Sheet 2
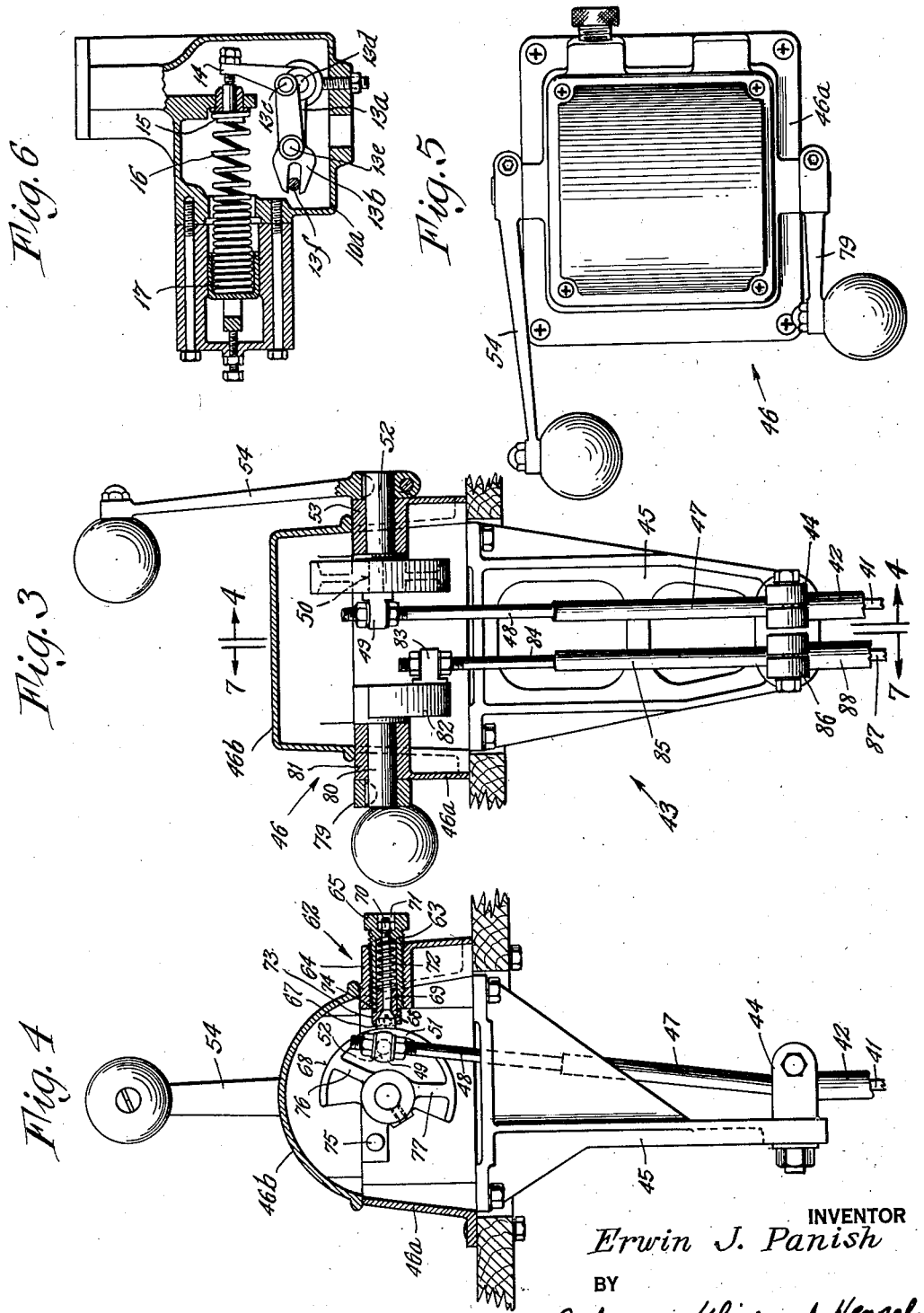
INVENTOR
*Erwin J. Panish*
BY
*Johnson, Kline and Hensel*
ATTORNEYS Dec. 19, 1950 E. J. PANISH 2,534,729
CONTROL DEVICE FOR PRIME MOVERS
Filed April 3, 1946 6 Sheets-Sheet 3
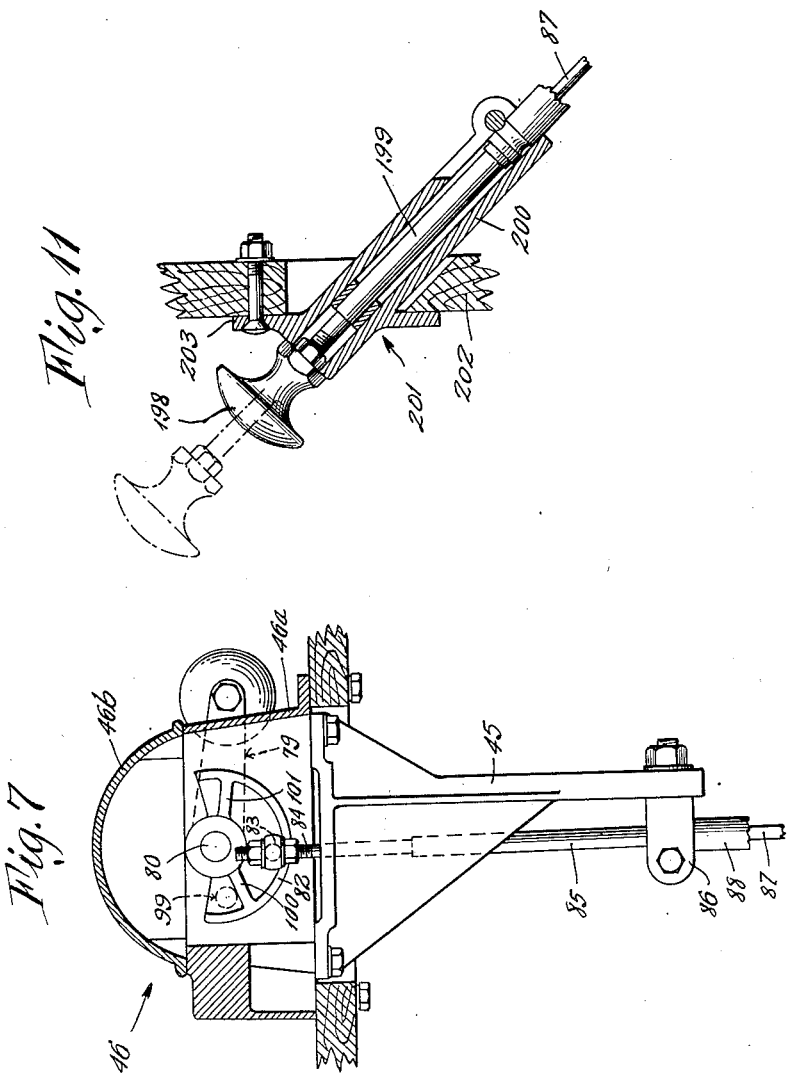
INVENTOR
Erwin J. Panish
BY
Johnson, Kline and Hensel
ATTORNEYS Dec. 19, 1950 E. J. PANISH 2,534,729
CONTROL DEVICE FOR PRIME MOVERS
Filed April 3, 1946 6 Sheets-Sheet 4
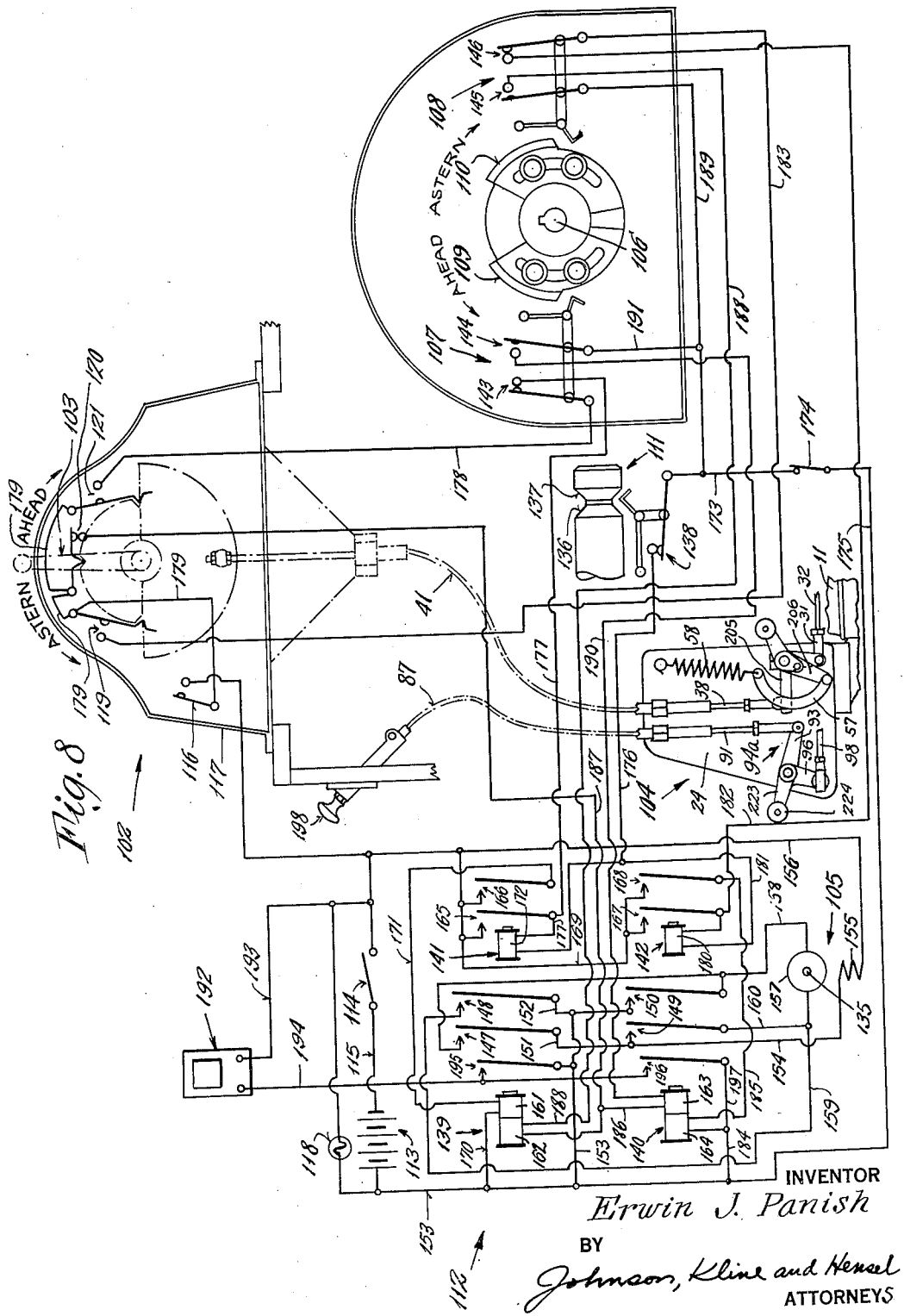
INVENTOR
Erwin J. Panish
BY
Johnson, Kline and Hensel
ATTORNEYS

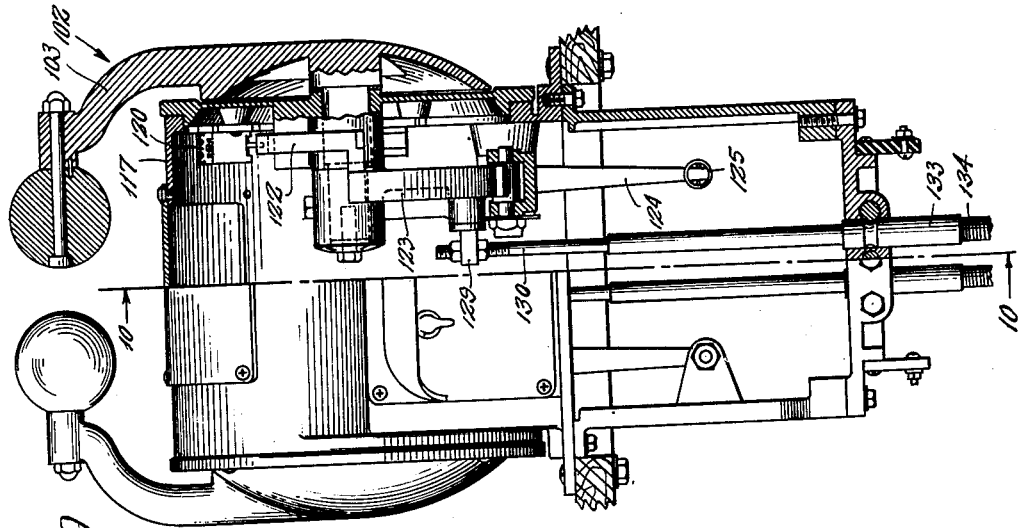
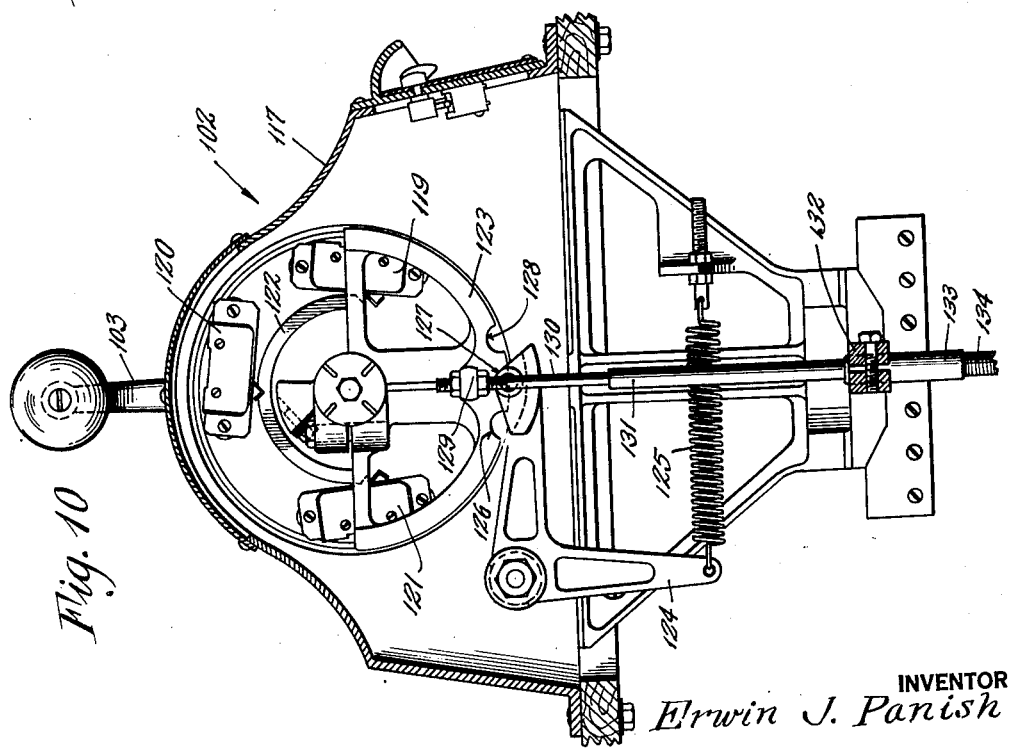

Dec. 19, 1950 — E. J. PANISH — 2,534,729
CONTROL DEVICE FOR PRIME MOVERS
Filed April 3, 1946 — 6 Sheets-Sheet 6
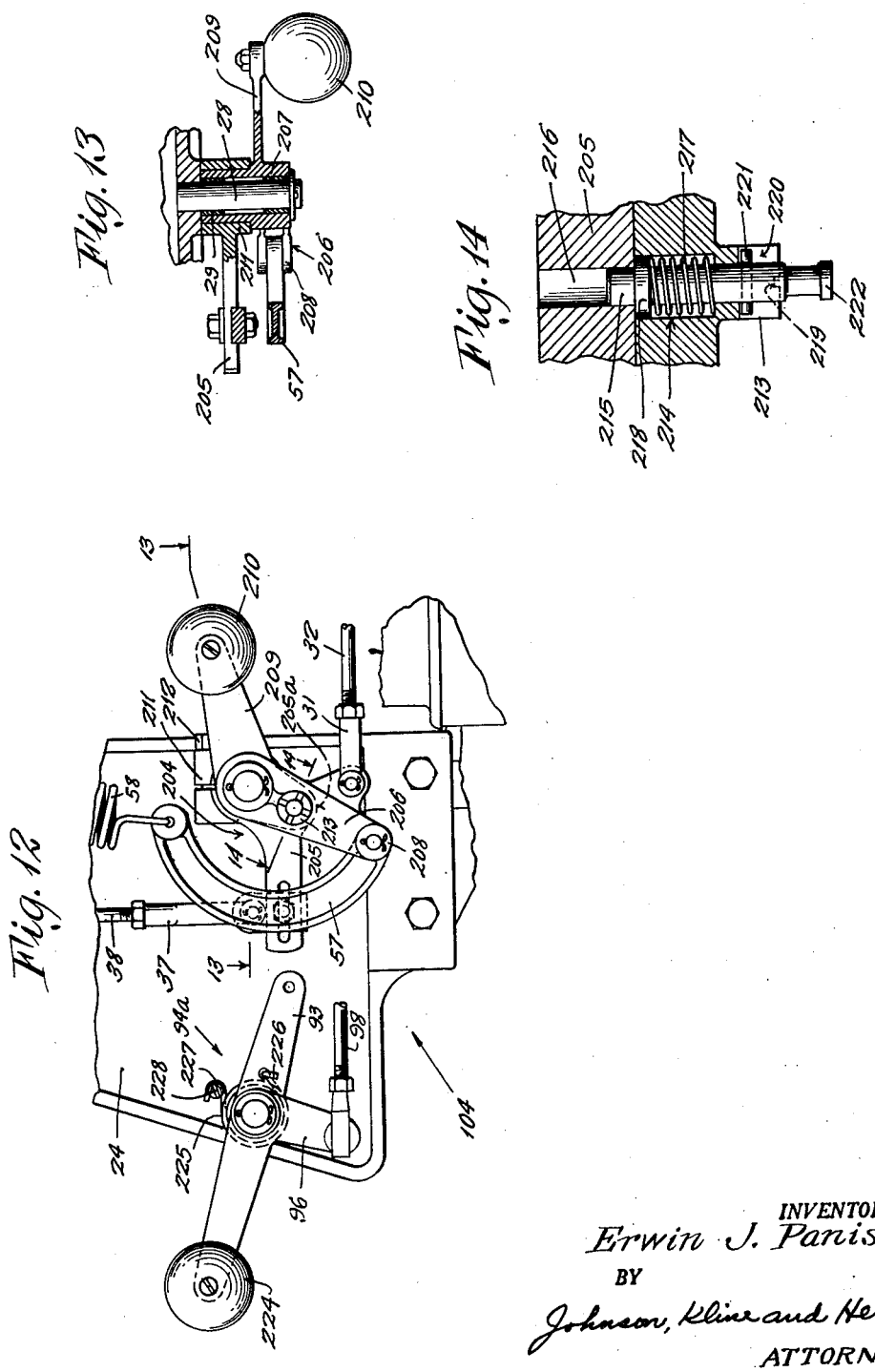
INVENTOR.
Erwin J. Panish
BY
Johnson, Kline and Hensel
ATTORNEYS Patented Dec. 19, 1950

UNITED STATES PATENT OFFICE 2,534,729

CONTROL DEVICE FOR PRIME MOVERS

Erwin J. Panish, Bridgeport, Conn.

Application April 3, 1946, Serial No. 659,205

23 Claims. (Cl. 192—.096)

This invention relates to control devices for use in connection with prime movers.

The invention is shown as applied to a marine Diesel engine wherein the speed is controlled by varying the loading on a variable speed governor, and wherein the output is transmitted through a reverse gear mechanism. Such engines and systems find wide use in marine craft, to power cutters and other vessels. However, it should be understood that the invention is not to be limited to the specific application illustrated and described.

A variable speed governor for a Diesel engine comprises a centrifugal weight mechanism which is loaded by means of a spring, the latter being controlled by the position of a speed-control lever which is in turn actuated to change the speed of the engine.

Movement of the speed-control lever is opposed by the governor spring, the force of which increases as the lever is moved toward full speed position. The magnitude of this force is so great that heretofore it has been impossible to obtain what is termed "finger-tip control," either at the engine or at a remote point such as the bridge of a vessel. A further difficulty due to the large magnitude of this force has been, that in overcoming the reaction of the spring on the control lever, some sort of releasable locking means had to be employed which, by its nature, caused inconvenience and delay in the operation of the control.

The present invention overcomes these difficulties, an object of the invention being to provide, for the throttle or speed-control member of a prime mover, a control device the operable means of which has direct or positive mechanical linkage with the said member to actuate the same, and which device is so organized that the force required to move the said means is comparatively small, so that a finger-tip type of control is obtained.

This is accomplished by providing, coupled to the direct linkage of the control device, automatic means for opposing or balancing the progressively increasing force to which the speed-control member of the prime mover is subjected as the member is moved between its settings. As a result, the operation of the control device is smooth and easy, and may be carried out manually by pressures such as are exertable by the tips of the fingers in contradistinction to force applied by grasping a member in the hand.

Another object of the present invention is to provide a remote control device for the throttle or speed-control member of a prime mover, which device has an extended direct or positive mechanical linkage with the member, and in which the said linkage is not subjected to large forces or loading, but instead is called upon to transmit only comparatively small forces.

By this organization, in addition to attaining a finger-tip control, the mechanical linkage of the device may be of the convenient and economical push-pull cable type, which is easily and quickly installed and may be run through constricted and out of the way spaces.

A feature of the invention is the simplicity of the structure provided for this purpose. In a preferred embodiment of the invention illustrated herein, the opposing or balancing means includes a lever connected with the linkage system of the control device to move therewith, and includes a compensating extension coil spring having one end coupled to the end of the lever, and having the other end anchored at a point on the opposite side of the fulcrum of the lever, the said spring being so located that a progressively increasing assisting turning moment is applied by the lever as the latter moves with the linkage. This assisting turning moment substantially counterbalances the variable moment produced by the loading spring of the Diesel engine governor, for instance, for substantially all positions of the speed-control member.

The assisting force of the compensating spring is applied to the governor speed-control member or to the driving linkage therefor at a point adjacent the governor and between the latter and the push-pull cable so that neither the loading of the governor nor the compensating force is carried by the push-pull cable. Therefore the said cable is unburdened except for its own internal friction. Further, by this arrangement it is not necessary to latch or clamp the operating means of the control device in any adjusted position, whether the means be located at the engine or at the remote control station, as was the case heretofore.

The anchored end of the compensating extension spring may be adjustably secured in place, so that the tension of the spring is readily and conveniently adjustable during installation of the control device, to match and oppose the force of the governor spring.

Another feature of the present invention is the provision of a friction device at a remote control station, to prevent the manually operable means thereof from creeping. Provision is made at the said friction device for locking the manually operable means in any adjusted position if this should be desired, as for instance on stationary prime movers where constant speeds may be required for long periods.

Another object of the present invention is to provide a simple and reliable device for controlling simultaneously both the speed-control member and the reverse gear, in the prime mover of a marine craft, the said device being responsive to finger-tip pressures, and being operable to enable practically instantaneous reversing of the propeller of the craft without likelihood of stalling of the engine. Such a control is of considerable value where, for instance, a high degree of maneuverability is required to meet emergencies.

In accomplishing this, there is provided, under the control of a single operable member a fingertip type direct or positive connected speed-control mechanism and a power-operated reversing mechanism, the latter having an extremely rapid response characteristic. The organization is such that, in a marine installation, a "lightning" changeover may be made from full speed ahead to full speed astern and vice versa in an interval of approximately three-fifths of a second. During such changeover the speed-control member of the prime mover is automatically, positively and without any lag, first moved to retarded position and then again moved to advanced position, the retarded position corresponding with the changeover position of the reverse gear control. However, the response characteristic of the reverse gear control is so rapid that, in conjunction with the positive, non-lagging speed control, stalling of the engine is averted, since the latter has no time in which to slow down, and since there is no dwell of the speed-control in idling or retarded-throttle position.

The combination control device when operated in the normal, more deliberate manner functions to automatically throttle and therefore decelerate the prime mover when changing from full ahead or full astern to neutral position, after which deceleration the reverse gear is operated to disengage the prime mover. When changing from neutral to full ahead or full astern, the reverse gear is first operated, and then the speed-control member of the prime mover automatically actuated following the coupling of the propeller. These operations, except for the deceleration of the prime mover, occur in sequence when the control is quickly operated from full ahead through neutral to full astern or vice versa, because of the extreme rapidity with which the reversing mechanism responds. During such quick operation, the momentum of the prime mover does not permit its slowing down to any appreciable extent in the short interval that the throttle is retarded, and this is extremely advantageous since it prevents the prime mover from stalling after sudden increased load is imposed on it due to the reversing of the propeller.

The portion of the device which controls the reversing mechanism includes electrically powered means, the said means operating with such rapidity that there is no noticeable lag in the response to the control, regardless of the speed of manipulation of the manually operable means.

Where an installation is made in a vessel having twin engines, two manually operable members may be provided at the remote control station, each to control a separate operating mechanism connected with the engines. In such a circumstance the operating members are positioned adjacent each other so that they may be operated simultaneously by one hand, thereby to enable quick and convenient dual control of the engines in unison. Or if desired, the controls may be actuated separately and independently of each other, where a maneuver might require driving of only one propeller, etc.

Where the remote control station has a single manually operable lever to control either the speed or the speed and transmission of the prime mover, a second lever is provided adjacent the first for actuating the shut-down control of the prime mover. This second lever is coupled in a novel manner to the shut-down control of the engine so as to be automatically self-locking when in operative position, release being effected without any extra operations being required of the operator, merely by returning the lever to "shut-down" position. In twin engine installations where the remote control station has two speed-control levers adjacent each other, one for each engine, a different type of manually operable control is provided for actuating the shut-down mechanisms of the engines, the said control being removed from the speed-control levers but readily accessible and conveniently operable.

A further object of the invention is to provide, for an internal combustion engine, an improved means located at the engine for quickly and conveniently actuating independently of each other the respective speed-control and shut-down members of the engine, the said means having particular utility in connection with a remote engine control, whether the control includes or excludes control of the engine clutch.

In accomplishing this, the remote control device of the invention is provided with a novel releasable coupling means in the positive mechanical linkage or drive, the said means being located at the engine and being actuatable to disconnect the remote portion of the drive from the portion connected with the automatic force-opposing or balancing means. A manually operable member is provided for actuating the said latter portion of the drive to change the engine speed, and a frictional device becomes operative between the two portions of the drive upon their being disconnected, thereby to utilize the inherent friction of the said remote portion to effect a check on the movement of the parts and prevent creepage of the proximal portion of the device. The releasable coupling is so constituted that the relatively movable parts thereof may be made to engage and lock with each other in but a single relative position, so that restoring of the control to the remote setting will always properly connect the two portions of the mechanical drive, and restore the remote manual control lever to proper relationship with the engine speed-control lever. By the provision of the said means for enabling actuation of the shut-down and speed-control members at the engine, adjustments of fuel, engine speed, etc., and warming up of the engine may be conveniently accomplished. Also operation of the engine in driving a winch, or to run the ship's generator, which latter involves adjustment of engine speed to secure proper voltage, is easily carried out. Or, if an emergency condition of the engine requiring immediate shut-down should arise, it is possible for the engineer to quickly meet this condition when stationed at the engine.

Other features and advantages will hereinafter appear.

In the accompanying drawings:

Figure 1 is a side elevation of an engine-mounted part of the present control device, which part is concerned with the controlling of the engine speed and shutting down of the engine, the said part being shown connected with a variable speed governor, and a portion of the governor being shown in vertical section.

Fig. 2 is a plan or top view of the part of the control device shown in Fig. 1, and of a portion of the governor connected therewith.

Fig. 3 is a vertical section through a remote control station of the device of the invention, the said station being adapted for use with the engine-speed and shut-down control mechanisms of Figs. 1 and 2.

Fig. 4 is a section taken on the line 4—4 of Fig. 3.

Fig. 5 is a top view of the remote control station of Figs. 3 and 4, but with the longer of the manually operable levers turned to foremost horizontal position.

Fig. 6 is a horizontal section taken on the line 6—6 of the governor of Fig. 1, but with the parts in idling position.

Fig. 7 is a section taken on line 7—7 of Fig. 3.

Fig. 8 is a schematic diagram of a combined engine-speed, shut-down, and reverse-gear control system applicable for use with marine craft.

Fig. 9 is a view, partly in elevation and partly in section, of the manual control station of the system of Fig. 8.

Fig. 10 is a vertical section taken on the line 10—10 of Fig. 9.

Fig. 11 is a detail, in section, of the shut-down actuator of the system of Fig. 8.

Fig. 12 is a fragmentary elevational view of the engine-mounted part of the control device shown in Fig. 1, but with the said part provided with means for controlling at the engine the engine speed and shut down.

Fig. 13 is a section taken on the line 13—13 of Fig. 12, and

Fig. 14 is a section on line 14—14 of Fig. 12.

Figs. 1 through 7 illustrate a remote, engine-speed and shut-down control made in accordance with the invention, as applied to a variable speed governor 10 of a Diesel type engine 11. The governor 10 comprises a housing 10a carrying at its lower end a shaft 12 which is driven from the engine 11, and which has centrifugal balls 13 connected to control the fuel rack of the engine in the usual manner, through pin-connected levers 13a, 13b, and a driving pin 13c, Fig. 6, all located in the upper portion of the housing 10a.

A lever 14 in the housing 10 is connected to control the setting or loading of the balls 13, the said lever being connected to one end 15 of a compression coil spring 16 so that the latter applies force to the lever and operates the same to load the centrifugal balls 13. The other end 17 of the coil spring 16 is connected to, and adjustably positioned by a lever 18 carried by a shaft 19 within the housing 10a, the said shaft exteriorly of the housing having a speed-control lever 20 for connection with the speed-controlling means of the engine, operation of which means thereby varies the loading of the governor to effect changes in the engine speed.

The governor 10 also has a shut-down lever 20a, Figs. 1 and 2, which is actuated to shut down the engine, and also actuated prior to starting.

According to the present invention an improved finger-tip type control device is provided for controlling the engine speed and shut-down, the said device comprising, in the embodiment of the invention illustrated herein, a remote control attachment which may be quickly and conveniently secured to the engine frame, and connected to operate the speed-control and shut-down levers 20 and 20a respectively. This control attachment has compensating means for opposing and balancing the force of the compression spring 16 in the governor 10, thereby making possible actuation of the control lever 20 throughout substantially its entire range by the exercise of but little manual force.

The portion of my control device which is adapted to be mounted on the engine 11 comprises a base or bracket member 21 which may advantageously be a casting, the said member having a base portion 22 secured to the engine frame by screws 23, and having extended upwardly from the base portion, a vertical flat plate 24. A bell-crank 25 having arms 26 and 27 is pivotally mounted on the plate 24 by means of a stud 28 rigidly secured to the latter, and preferably anti-friction bearing means 29 are provided between the hub 30 of the bell-crank 25 and the stud 28 to prevent the bell-crank from binding or dragging. The arm 26 of the bell-crank is pivotally connected with a bifurcated fitting 31 which receives one threaded end of a link rod 32 the other threaded end of which is received in a bifurcated fitting 33 pivotally connected to the speed-control lever 20 of the governor.

The arm 27 of the bell-crank 25 is provided with a slot 34 receiving a bolt 35 by means of which a short link 36 is adjustably secured to the said arm. A bifurcated fitting 37 is pivotally connected with the link 36 and receives the threaded end of a link rod 38 slidable in a sleeve 39 pivotally carried by a bracket 40 secured to the upper portion of the vertical plate 24 of the base member. The other end of the link rod 38 is secured to the end of a push-pull cable 41 within the sleeve 39, the said cable being carried in a protective sheath 42 secured in the bracket 40, and the said sheath and cable extending to the remote control station 43 shown in Fig. 3, where the sheath is secured in a bracket 44 mounted on the lower end of a depending frame 45 carried by the housing 46 of the remote control station. The push-pull cable 41 extends through the bracket 44 and into a sleeve 47 pivotally secured to the bracket, in which sleeve it is joined to the end of a link rod 48 secured to the head 49 of a stud 50 pivotally carried by a segment 51 mounted on and keyed to an operating shaft 52 rotatable in a bearing 53 of the housing 46. The shaft 52 extends through the bearing 53 and at its outer end carries a manually operable lever 54.

According to this construction, operation of the lever 54 turns the shaft 52 and segment 51, which latter carries the stud 50 in an arc, thereby raising and lowering the link 48 through an arcuate path and driving the push-pull cable 41. Referring to Fig. 1, longitudinal movement of the cable 41 causes movement of the bell-crank 26 thereby to operate the speed-control lever 20 between its retracted or idling position and its extended or full-speed position, these positions being indicated in the drawing.

According to this invention, means are provided for counterbalancing the force of the compression spring 16, which force is imposed on the speed-control lever 20 and becomes progressively greater in opposing the movement of the latter toward its full-speed position. By opposing the force of the spring 16 with a force having a substantially equal magnitude substantially throughout the range of operation of the lever 20, I have found that the latter may be actuated by the application of a comparatively small operating force, thereby relieving the push-pull cable 41 of any great load throughout the operating range of the control, and making possible finger-tip operation of the lever 54.

In accomplishing this, in the specific embodiment of the invention illustrated herein, I provide a lever 55 which is pivotally carried by the stud 28 on the base plate 24, preferably through the medium of the anti-friction bearing means 29, the said lever being rigidly secured to the bell-crank 25 as by means of a cap screw 56. The extremity of the lever 55 is bifurcated to receive one end of a curved link 57 which is pivotally secured thereto, the other end of the link being connected with the end 58a of a coil extension spring 58 the other end 58b of which is secured to a stud 59 adjustably carried in a slot 60 in the vertical plate 24. An adjusting screw 60a passes through the edge of the plate 24, and is threaded into the stud 59 for raising or lowering the latter, and a nut 60b is provided for locking the stud 59 in any adjusted position.

The upper end 58b of the coil spring 58 is thus located in a particular predetermined position on the opposite side of the pivot stud 28 from the end of the lever 55, this position being such that, for the idling positions of the parts of the control, the spring 58 will exert a force on the lever 55 which is directed substantially at or toward the pivot stud 28. In the said idling positions, the lever 55 will extend along the dotted line AA shown in Fig. 1, the lever 20 of the governor extending along the line BB, and the direction of the force exerted by the spring 58 on the end of the lever 55 will be slightly to the right of the pivot stud 28. Also, the manually operable lever 54 at the remote control station 43 will be substantially horizontal, swung approximately 90° clockwise from the position shown in Fig. 4. As the control lever 54 is moved counterclockwise from this horizontal position to advance the lever 20 from the idling position toward full speed position, the compensating lever 55 will move clockwise so that the line of the force exerted thereon by the spring 58 passes through the center of the pivot 28, and then to the left thereof.

During this initial actuating movement, the compensating lever 55 and spring 58 have little effect on the operation of the control, since the force required to initially move the speed-control lever 20 is not excessive, due to the governor loading spring 16 being only slightly compressed. However, as the movement of the parts is continued, and the positions shown in Fig. 1 are reached, the turning moment imposed on the lever 55 by the spring 58 becomes substantial, due to the line of force of the spring becoming more widely separated from the center of the stud 28. This separation or distance, multiplied by the force exerted by the spring 58 equals the turning moment imposed on the movable system, which turning moment opposes the action of the governor loading spring 16. As the parts of the control are operated further, to advance the speed control lever 20 toward full-speed position and beyond the position shown in Fig. 1, the compensating lever 55 in moving further clockwise results in the turning moment which it applies becoming greater, due to the fact that the distance between the line of force of the spring 58 and the center of the pivot 28 increases much more rapidly than the decrease in the magnitude of the force due to the spring 58 being less extended.

By varying the position of the stud 59, the tension of the spring 58 may be regulated, and I have found that the compensation effected by the said spring may be made to substantially equal and compensate for the force exerted by the governor loading spring 16 during the major part of the movement of the speed-control lever 20 in approaching its full-speed position. Thus, very little operating force is required on the manually operable lever 54 and push-pull cable 41 in actuating the speed control lever 20.

It will be understood that during the initiation of movement of the speed-control lever 20 from its idling position, practically no compensation or opposition is offered by the spring 58 due to the line of force thereof passing through or substantially through the center of the pivot stud 28. However, during such initiation of movement, no effective compensation is required, since the opposition to such movement which is offered by the governor loading spring 16 is comparatively light, well within the capacity of the push-pull cable 41, and no excessive force is required in shifting the manually operable lever 54.

The compensation effected by the spring 58 is facilitated by the anti-friction bearing means 29 which carry the lever 55 and bell-crank 25 and prevent these from binding. Due to the inherent friction of the push-pull cable 41, the movable system of the control will remain in any adjusted position in which it is placed, since neither of the springs 16 and 58 overpowers the other to initiate any movement of the control.

For the purpose of preventing inadvertent creeping of the control due to vibration of the engine, accidental blows on the manually operable lever 54, etc., however, I provide a novel detent and locking means 62 mounted on the remote control station 43 for engagement with the segment 51 carried by the operating shaft 52. By so locating the detent means 62, the restraining action thereof when the lever 54 is operated to actuate the control does not impose any additional load on the push-pull cable 41, and therefore the only load that the detent might impose on the said cable would be the load occasioned by the effects of engine vibration on the moving parts of the system, located adjacent the engine, tending to shift these parts.

The detent 62 comprises a screw 63 threaded into a portion 64 of the remote control housing, said screw having a knurled head 65 for engagement by the fingers. The screw 63 is centrally bored and carries a plunger 66 in which is mounted a shoe 67 of leather or the like for engagement with the cylindrical surface 68 of the segment 51. The plunger 66 carries a screw 69 which extends through the bore of the screw 63 and has a nut 70 located in a counterbore 71 in the screw head 65. A compression coil spring 72 is carried within the bore of the screw 63 for engagement with the latter and with the plunger 66 to yieldably advance the plunger outward of the screw. Thus, the shoe 67 is made to yieldably press against the segment 51 when the screw 63 is turned-in an extent, to provide a clearance under the nut 70. By this arrangement, a restraint is placed upon movement of the segment 51, and therefore upon the entire movable system of the control, the said restraint being sufficient to prevent creeping of the parts due to engine vibration, etc.

The plunger 66 has a head 73 at the end of the screw 63, providing a shoulder 74 which may be engaged by the end of the screw when the latter is threaded sufficiently far into the portion 64 of the housing. When the plunger 66 is thus backed up by the screw 63, the pressure between the shoe 67 and the segment 51 may be greatly increased, so as to securely lock the segment 51 and therefore lock the movable system of the control device in any adjusted position. It will be noted that this locking may be quickly and conveniently effected merely by threading-in the screw 63, and the locking may be quickly released by merely unscrewing the screw slightly to enable the compression spring 72 to take over, in which case the friction of shoe 67 is lessened so as to enable the handle 54 to be manipulated for actuating the control.

In installation, when it is desired to match the extent of movement of the lever 54 to the range of movement of the speed-control lever 20, this may be conveniently accomplished by shifting the short link 38 on the arm 27 of the bell-crank 25, as made possible by the slot 34 in the said arm.

Referring to Fig. 4, the housing 46 of the remote control station is provided with a stop pin 75, which by engagement with a rib 76 of the segment 68 defines the extended or full-speed position of the lever 54, and by engagement with a second rib 77 of the segment defines the retarded or idling position of the lever.

It will thus be seen that, by the above construction I have provided a control system for actuating, through a positive mechanical linkage, the speed-control member of a prime mover, which system compensates for or balances the force that opposes movement of the speed-control member, to the end that the manually operable means of the system may be actuated by finger-tip pressures, and as a result the system may be characterized as a finger-tip control.

In connection with the compensating or balancing of the governor loading spring 16 it should be noted that the response of the engine and governor to movement of the speed-control lever 20 is extremely rapid. A factor in this rapid response is the leverage provided by the levers 13a and 13b of the governor, see Fig. 6, which leverage results in a comparatively large movement of the driving pin 13c actuating the fuel rack (not shown) of the engine. For example, if the speed-control lever 20 is shifted slightly so as to tend to compress the governor loading spring 16, the increased pressure of the latter will shift the lever 14 of the governor slightly in a clockwise direction. This results in an alteration in the position of the governor balls 13 which takes place simultaneously with clockwise movement of the lever 13a about its pivot or fulcrum 13d. The lever 13a is connected by a pin 13e to the lever 13b which fulcrums about a stationary pin 13f, and it will be seen that a small movement of the lever 14 will cause a correspondingly large movement of the driving pin 13c which actuates the fuel rack to increase the fuel supply to the engine. In consequence of this operation, movement of the lever 14 occasioned by increased pressure of the spring 16 will result in rapid response of the engine, the increased speed of which will partially return the lever 14 toward its previous position, and the net effect of these rapid movements is that the spring 16 provides a progressively larger opposition to movement of the speed-control lever 20 toward full-speed position as the lever approaches the said position.

The control system of the present invention also includes means located at the remote control station 43 and connected by linkage for actuating the shut-down lever 20a, Figs. 1 and 2, of the governor 10. Referring to Figs. 3 and 7, this means comprises a manually operable lever 79 carried by the exterior end of a shaft 80 journaled in a bearing portion 81 of the housing 46. The inner end of the shaft 80 mounts a segment 82 carrying a rotatable stud 83 which is connected with a link rod 84, and the latter extends into a sleeve 85 which is pivotally mounted in a fitting 86 carried by the lower portion of the depending frame 45 of the housing 46. Within the sleeve 85 the rod 84 is connected to one end of a push-pull cable 87 carried in a sheath 88 which latter is secured at its ends respectively to the fitting 86 and to a fitting 89 mounted on the upper portion of the vertical plate 42.

The push-pull cable 87 extends through the sheath 88 and into a sleeve 90 where it is connected to a link rod 91 secured to a bifurcated fitting 92 receiving and pivotally connecting with one arm 93 of a bell-crank 94. The crank 94 is pivotally carried on a stud 95 secured to the vertical plate 24, and has a second arm 96 pivotally connected with a fitting 97 carried by a link rod 98 which latter, Fig. 2, extends to and is pivotally connected with the shut-down lever 20a of the governor.

The positions of the parts of the shut-down control, as illustrated in Figs. 1, 2, 3 and 7, are such that the shut-down lever 20 is in "run" position. When it is desired to shut down the engine, the manually operable lever 79, Fig. 7, is turned counterclockwise approximately 180°, thereby moving and raising the link rod 84 through an arcuate path, and causing the bell-crank 94 to move counterclockwise so as to effect a clockwise turning of the shut-down lever 20a to shut-down position.

For the purpose of limiting the movement of the manually operable lever 79 a stop pin 99 is mounted in the casing 46 for engagement with ribs 100 and 101 of the segment 82, the ribs being so located as to define the "run" and "shut-down" positions of the lever 79.

Referring to Fig. 7 it will be noted that for the "run" position of the manually operable lever 79 the stud 83 carried by the segment 82 is slightly to the left of dead center position, and the segment is prevented from further clockwise rotation by the stop pin 99. As a consequence, an automatic lock is provided since any upward pressure on the link rod 84 such as might be caused by the shut-down lever 20a tending to return to shut-down position will merely serve to more securely hold the segment and lever in the position shown.

Preferably, as shown, the housing 46 comprises a base 46a (Fig. 5) which mounts the bearing portions 53, 64 and 81, and a removable cover 46b to provide for easy access to the housing interior.

In Figs. 8 through 11, a combination engine speed and transmission control system is shown, made according to the invention. This system comprises, in the embodiment illustrated, a simplified and reliable mechanism for controlling and correlating the speed-control member and the reverse gear, in the prime mover of a marine craft, the said system being responsive to finger-tip pressures, and being operable to enable practically instantaneous reversing of the propeller of the craft without likelihood of stalling of the engine. The system incorporates the direct-connected compensating speed-control mechanism described above, in combination with power-operated reversing mechanism, the latter having an extremely rapid response characteristic so that changeover from full speed ahead to full speed astern and vice versa is possible in the extremely short interval of approximately ⅗ of a second. The ability to accomplish such "lightning", changeover is of considerable advantage in maneuvering, especially under combat or emergency conditions.

Referring to Fig. 8, the salient parts of the control system comprise a remote control station 102 which may be located on the bridge of the vessel, the said station having a manually operable lever 103 direct-connected with compensating and linkage mechanism 104 located at the engine and connected with the governor 10. The manually operable lever 103 also controls switching means located at the station 102, thereby to actuate an electric motor 105, which latter is coupled to operate the reverse gear shaft 106 of the vessel. The parts further comprise switch banks 107 and 108 associated with cams 109 and 110 of the reverse gear shaft 106, a torque-responsive switch operator 111 associated with the motor 105, and banks of main and auxiliary relays 112 for controlling the power circuit of the motor. Energy for the system is supplied by a battery 113.

A switch 114, inserted in the main supply wire 115 from the battery, is provided to disconnect the latter when the control system is not in use. The switch 114 may be advantageously located on a panel, near the vessel's engine, on which the banks of relays 112 may also be mounted.

A switch 116 is also provided, located in the housing 117 of the remote control station 102, and connected to the wire 115 to enable an operator to cut off the station at the bridge and thereby render the station inoperative when so desired.

To provide an indication of the setting of the main switch 114, and therefore an indication of the condition of energization of the system, a signal bulb 118 is connected across the battery 113 and switch 114, the bulb being preferably mounted on the panel carrying the relay banks 112.

Referring to Figs. 9 and 10, the double control station 102 shown herein is similar in many respects to the double control station described in my patent, Number 2,387,343, dated October 23, 1945, and comprises two halves each for controlling a single engine and reverse gear, each operable by a separate manual lever, the functioning of one lever being similar to the functioning of the other. Only one-half the station 102 is depicted in Fig. 8 for use with the control circuits shown therein, which apply to a single engine and reverse gear, it being understood that two or more such circuits may be employed with a corresponding suitable multiple control station.

The manually operable lever 103 of the control station 102 is pivotally mounted in the housing 117 to be movable from a neutral position, shown in Fig. 10, either to the right or left to "ahead" or "astern" positions respectively. A plurality of micro-switches 119, 120 and 121 is mounted on the inside of the housing 117 for operation by a cam segment 122 secured to the lever 103, the segment at its center being notched so that for the neutral position the switch 120 is closed, as shown in Fig. 8. For this position of the lever 103 the cam segment 122 does not engage the switches 119 and 121, and the latter are arranged to remain open in such circumstance. When the lever 103 is moved either to the left or right sufficiently to cause the cam segment to fully engage one of the switches 119, 121, the engaged switch will be closed, and the switch 120 will be in open position.

To enable these switch-engaging positions, and also the neutral position, to be determined by "feel," and to provide a detent means, a segment 123 is mounted within the housing 117 rigid with the segment 122 and lever 103, and a bell-crank 124 biased by a spring 125 provided, for engagement with the notches 126, 127 and 128 in the segment, as shown in Fig. 10.

The lever 103 and segments 122 and 123 may be moved beyond the positions defined by the notches 126 and 128 for the purpose of in each case advancing the throttle of the engine; however, the condition of all the switches is not altered from their initially changed condition by this additional movement of the lever, due to the segment 122 continuing to bear on the switch 120 and on either one of the switches 119, 121, according to the direction of movement of the lever 103.

For controlling the throttling of the engine in response to movement of the lever 103 as indicated above, the segment 123 is provided with a fitting 129 to which is secured a link 130 slidable in a sleeve 131 swivel-mounted at 132 in a cable ferrule 133 which is in turn rigidly connected with the housing 102. The link 130 may be coupled by means of a push-pull cable 134 to control the bell-crank 25 of the compensating and linkage mechanism 104, and thereby to actuate the speed-control lever of the engine. The mechanism 104 is similar, considering operation from the station 102, to the mechanism shown in Fig. 1, and corresponding parts have been given like characters, it being understood that the mechanism 104 may be connected to operate the speed-control lever 20 of the engine governor 10 so that control of the engine speed is accomplished by finger-tip pressures on the lever 103 at the remote station 102, and that a positive mechanical linkage is effected between the lever 103 and the speed-control lever 20. Thus, when the lever 103 is swung to either side of neutral position (for which position the throttling of the engine is set at idling and the speed-control lever 20 of the governor is in the position of the line B—B), the fitting 129 is moved in an arcuate path, swinging the sleeve 131 and link 130, and sliding the latter outward of the sleeve, advancing the speed-control lever 20.

Referring to Fig. 8, the reversible motor 105 has a shaft 135 coupled to drive the vessel's reverse gear or transmission-operating shaft 106, and the coupling between the shafts 135 and 106 may advantageously be through an overhauling worm drive of the type illustrated and described in my above-referred-to patent.

As a result of the said coupling, energization of the motor 105 will cause the reverse gear shaft 106 to be moved either clockwise to "astern" position, or counterclockwise to "ahead" position.

By means of the said overhauling worm drive referred to, the torque-responsive switch operator 111, which is in the form of a cam having faces 136 and 137, is shifted either to the right or to the left from the position shown in Fig. 8 when the motor 105 has completed movement of the reverse gear shaft 106 to either "ahead" or "astern" positions, the said shifting of the operator causing the associated switch 138 to open. The switch 138 is so connected, as will be later brought out, that when opened it immediately deenergizes the motor 105, and as a result of such deenergization the operator 111 will be returned to the centralized position shown, allowing the switch 138 to automatically reclose.

In the system shown the energization of the motor 105 may be controlled at will by movement of the combination speed and reverse gear control lever 103, the motor being automatically deenergized by the torque responsive switch 138 and also by the switch banks 107 and 108 responsive to the positioning of the reverse gear actuating shaft 106. Essentially this system comprises a circuit arrangement including pairs of motor-reversing relays 139, 140 and control and holding relays 141, 142, and pairs of mechanically coupled, oppositely acting switches 143, 144 and 145, 146, the switch pairs comprising respectively the switch banks 107 and 108 which are under the control of the cams 109 and 110 carried by the reverse gear operation shaft 106. The above parts are so interconnected, and connected with the torque switch 138 and with the switches at the control station 102 as to produce a reliable, attention-free control having desirable characteristics and advantages.

Figure 8 shows the positions of the parts when the control is set for neutral. Considering first the energization for the motor 105, the motor power circuit may be traced as follows: the relay 139 has groups of mechanically coupled contacts 147, 148, and the relay 140 groups of mechanically coupled contacts 149, 150, the respective groups being connected together by wires 151, 152, as shown. The wire 152 is connected by a wire 153 to one terminal of the battery 113, and the wire 151 connected by a wire 154 to the motor field 155 which latter is connected by a wire 156 to the supply wire 115 from the battery. The motor armature 157 is connected by a wire 158 to the contact groups 150 and 147, and connected by wires 159 and 160 to the contact groups 148 and 149. This is the conventional reversing circuit for a series motor; when the relay 139 is energized, the contact groups 147, 148 will be closed and the motor driven in one direction, and when the relay 140 is energized, the contact groups 149, 150 will be closed and the motor 105 driven in the opposite direction.

Control of the motor-reversing relays 139, 140 is accomplished by the control relays 141 and 142 in the following manner. The relay 139 has two separate energizing windings 161 and 162, either of which when energized may operate the contact groups of the relays, the winding 161 being under the control of the control relay 141, and being energized only when the manual control lever 103 is moved from neutral position to "ahead" position. Similarly the relay 140 has two separate windings 163 and 164, the latter winding being energized only when the control lever 103 is moved from neutral to "astern" position.

The control relays 141 and 142 have pairs of small-current contact groups 165, 166 and 167, 168, respectively, all the groups being connected by a wire 169 to the wire 156 energized from the battery lead 115.

Considering the relay 139, the winding 161 is connected by a wire 170 to the wire 153 from the battery, and by a wire 171 to the contact group 166 of the holding relay 141. Thus, when the relay 141 is energized or deenergized, it energizes or deenergizes the winding 161 of the relay 139.

The energization of the winding 172 of the relay 141 is under the control of three switches which are connected to said winding in a series circuit, and such energization may be effected only when all three switches are closed. These switches are the switch 121 at the control station 102, the switch 143 operated by the cam 109 of the reverse gear operating shaft 106, and the torque switch 138 operated by excess driving force from the motor 105. As shown, the torque switch 138, which in practice is closely adjacent the engine, is connected by a wire 173 to a cut-out switch 174 which also may be mounted at the engine, the purpose of which latter switch will be brought out later. From the switch 174 a wire 175 extends to the wire 153 from the battery; and the other terminal of the torque switch 138 is connected by a wire 176 to the relay coil 172, the latter being connected by wires 177 and 178 through the switch 143 to the switch 121 at the control station 102. The switch 121 is in turn connected by a wire 179 to the off-and-on switch 116 for the station.

Control of and connections for the relay 142 are somewhat similar, but arranged for reverse or "astern" operation. The coil 180 of the relay 142 is connected by a wire 181 to the wire 176, and connected by wires 182 and 183 through the switch 146 to the switch 119 at the control station 102, the latter switch being connected with the wire 179. Thus all three switches 138, 146 and 119 must be closed to effect energization of the relay coil 180. The coil 184 of the motor-reversing relay 140 is connected by a wire 184 to the return wire 175, and by a wire 185 to the contact group 168 of the holding relay 142, so as to be under the control of the latter.

After either one of the relays 141, 142 has been initially energized, its energization is maintained independently of the switches at the control station 102 and at the switch banks 107 and 108 by holding contact groups 165 and 167 which are connected to bridge said switches. Thus, after initial energization of either of the relays 141 and 142, deenergization may be accomplished only by opening the torque switch 138.

As shown, the contact group 165 is connected by the wires 169 and 177 to effect bridging of the switches 143 and 121, and the contact group 167 connected by the wires 169 and 182 to effect bridging of the switches 146 and 119.

According to the above circuit arrangement, with the switches 114 and 116 closed, if the control lever 103 is moved from its neutral position shown to an "ahead" position wherein the detent notch 126, Fig. 10, is engaged, or beyond this position, the switch 120 will be opened and the switch 121 closed. This latter will cause the relay 141 to be energized through the switches 143 and 138, and accordingly will energize the relay 139 and drive the motor 105 forward. The latter will drive the shaft 106 and cams 109 and 110 counterclockwise, opening the switch 143 and closing the switch 144. Opening the switch 143 does not now affect the energization of the relay 141 because of the holding contacts 165 of the latter.

The motor 105 will drive the shaft 106 to the limit of the latter's movement, whereupon the increased load on the motor will cause displacement of the cam 111 and opening of the torque switch 138 controlling the circuit of the relay 141. Therefore the relay 139 and the motor 105 will be deenergized.

The torque switch 138 will now reclose, but since the switch 143 remains open, no further energization or operation results.

The reverse gear or transmission of the vessel has now been engaged for forward movement, and the lever 103 may be moved back and forth along its arc of travel to the right of the neutral position, Fig. 8, to control the engine speed by actuating the speed-control lever 29 of the governor, all without further operating the transmission. In this circumstance it will be noted that the control system itself, omitting the pilot light 118, is electrically deenergized, that is, drawing no current from the battery 113.

Considering again the neutral position of Fig. 8, but with the switches 114 and 116 closed, if the control lever 103 should be moved from the neutral position to an "astern" position wherein the detent notch 126 is engaged, or beyond this position, the switch 120 will be opened and the switch 119 closed. This latter switch will cause energization of the relays 142, 146, and reverse energization of the motor 105, so that the shaft 106 and cams 109 and 110 will be driven in a clockwise direction. The switch 146 will now be opened and the switch 145 closed by the cam 110, and, as the shaft 106 reaches the limit of its movement, engaging the transmission for reverse or "astern," the increased load on the motor will result in displacement of the cam 111 and opening of the torque switch 138. This will deenergize the system in a manner similar to that already explained, and the cam 111 will be returned to the centralized position shown, allowing the switch 138 to reclose. However, the system still remains deenergized, and the control lever 103 may be moved back and forth along its arc of travel to the left of the neutral position (Fig. 8) to control the speed of the engine.

The disengagement of the transmission or "reverse gear" by return of the shaft 106 to neutral from either the "ahead" or "astern" position to which it has been driven by the motor 105 is accomplished by energization of the relays 139, 140 through the coils 162, 163 thereof. Energization of one or the other of these coils is accomplished through circuits energized by returning the control lever 103 to neutral position, the selection of the correct relay coil being automatically effected by the switches 144 and 145 of the switch banks 107, 108 under the control of the cams 109 and 110.

The circuits for effecting energization of the coils 162, 163 to return the shaft 106 to neutral are as follows: Both coils have a common connecting wire 186 which is connected by a wire 187 to the switch 120 at the station 102. The coil 162 is also connected by wires 188 and 189 through the switch 145 to the return wire 173, and the coil 163 connected by wires 190 and 191 through the switch 144 to the wire 189 and thence to the return wire 173.

Assuming the control is being operated in the "ahead" position wherein the lever 103 is to the right of neutral (Fig. 8), the switch 120 will be open and the switch 121 closed. For this condition, the shaft 106 and cams 109 and 110 will have been rotated counterclockwise from the positions shown, so that the switch 143 is open and the switch 144 closed. If now the lever 103 is returned to centralized or neutral position, the switch 120 will be closed, and a circuit completed through the same, the relay coil 163 and the switch 144. The relay 140 being energized, will connect the motor 105 for operation to return the shaft 106 to neutral position. Immediately before the shaft 106 and cams 109 and 110 reach neutral, the switch 144 will be permitted to again open, thereby deenergizing the relay 140 and therefore the motor 105. The inertia of the latter will carry the shaft 106 and cams beyond the cut-off point, however, to approximately the neutral position again, the circuits of the control being as shown in Fig. 8, wherein they do not draw current from the battery 113.

Similarly, if the control is operating in the "astern" position wherein the lever 103 is to the left of neutral as viewed in Fig. 8, the switch 120 being open, the switch 119 closed, and the switches 145 and 146 respectively closed and open due to the cam 110 and shaft 106 having been rotated clockwise, shifting of the lever 103 to neutral will close the switch 120, energize the relay coil 162 through the switch 145, and cause rotation of the motor 105 to drive the shaft 106 and cam 110 counterclockwise. The switch 145 will then be operated to break the relay circuit so that the shaft 106 and cams 109 and 110 come to rest in the neutral position shown.

An extremely advantageous feature of the control system of this invention is that the combination of speed and transmission control as set forth enables a "lightning" change being made, with "finger-tip" pressures, from full speed ahead to full speed astern, or vice versa, in approximately ⅗ of a second. Such a change is made by sweeping the lever 103 from one extreme position through neutral to the opposite extreme position. During such movement the speed-control lever 20 of the governor 18 is positively operated, being first closed and then again fully opened, and since the time of movement is extremely short, the inertia of the engine does not permit it to decelerate appreciably. The response of the relays to the quick movement of the lever 103 is extremely rapid, as is the response and operation of the motor 105. However, the closing of either of the holding relays 141 and 142 when the shaft 106 and cams 109 and 110 pass through neutral always occurs before the opening of the associated one of the relay energizing switches 146 and 145, due to the power and the small inertia of the relays as compared with the position of the cams 109, 110, and their speed.

As a result, during such quick operation of the control lever 103 it is impossible for the motor 105 to be left deenergized before it has completed the reverse coupling between the engine and the propeller. Thus a situation could not exist due to such rapid change where the speed-control lever 20 is fully advanced and the transmission is in neutral position.

Although, during such rapid change from full speed ahead to full speed astern or vice versa, a heavy load is imposed on the engine due to the reversing of the propeller, the engine will not stall because of its inertia plus the fact that the speed-control lever 20 is advanced when the load is imposed. The response and operation of the control is so rapid that for all practical purposes no lag may be observed in the operation of the transmission.

The detent notches 126, 127 and 128 in the segment 123 of the control station 102 function, when the lever 103 is operated in the normal slow and deliberate manner, to apprise a user, by feel, of the three different positions of the lever corresponding to the ahead, neutral and astern conditions of the reverse gear or transmission.

An important feature of the control system of the present invention is the provision of the single conductor or lead 173, 175 and the cut-out switch 174 in said lead, located at the engine. If for any reason, as when an emergency arises, it is necessary to remove the engine from the control of the system, and operate the reverse gear shaft 106 by hand, the engineer at the engine may do this by merely opening the switch 174 and operating the usual manual control (not shown) for the shaft 106. Where two engines are being operated simultaneously from the bridge of the vessel by two control circuits, it is a simple and convenient matter for an engineer stationed at the engines to disconnect either one or both from the bridge control, and operate the reverse gears manually should this be necessary at any time.

For the purpose of providing a signal to indicate when the transmission is in operation, a buzzer 192 is employed, connected by a wire 193 to the wire 115 and by a wire 194 to contact groups 195 and 196 associated with the relays 139 and 140 respectively, the contact group 195 being connected with the wire 153 and the contact group 196 by a wire 197 to the wire 184.

Whenever either of the relays 139, 140 is energized, the buzzer 192 will sound. The operation of the system is so rapid, however, that the buzz produced by the buzzer is of extremely short duration.

For the purpose of actuating the shut-down lever 78 of the governor from the remote control station 102 a manually operable push-pull knob 198 is provided, Figs. 8 and 11, the said knob being secured to a link rod 199 slidably mounted in a sleeve-like portion 200 of a fitting 201. The link rod 199 may be connected with the end of the push-pull cable 87 which, as shown in Fig. 2, actuates the bell-crank 94 and in turn the shut-down lever 78. The knob 198 and fitting 201 are preferably mounted on the bulkhead 202 at the vessel's bridge, the fitting having a circular flange 203 for this purpose, located angularly with respect to the sleeve portion 200 so that the latter extends downwardly at an angle within the bulkhead.

The parts of the shut-down control are shown in the "run" position, in Figs. 1, 2, 8 and 11, the knob 198 being in retracted position close to the bulkhead 202. When it is desired to shut down the engine the knob 198 is pulled upward and outward to the position shown by the dotted lines of Fig. 11. This rotates the bell-crank in a counterclockwise direction, shifting the link rod 98 to the right and turning the shut-down lever 78 clockwise to its shut-down position.

According to the present invention improved means are provided, located at the engine 11, for quickly and conveniently actuating the respective speed-control and shut-down members of the engine independently of the remote control, the said means being of advantage in connection with control devices both having and not having clutch-actuating means.

Referring to Figs. 8 and 12, the link rods 32 and 38 of the mechanism 104 of the control device are coupled to each other through the medium of a two-part bell-crank 204 having independently movable arms 205 and 206. The arm 205 is connected with the link rod 38 through the fitting 37, and the link rod 32 connected with the arm 206 through the fitting 31. As shown in Fig. 13, the bell-crank arm 206 has a hub 207 carried by the needle bearings 29 of the stud 28, and also has a bifurcated end 208 connected with the curved compensating link 57. Another arm 209 is rigidly connected to the bell-crank arm 206, and carried at its extremity a knob 210 for enabling manual operation of the bell-crank arm 206.

The arm 205 of the bell-crank has a split hub 211, Figs. 12 and 13, the said hub being compressible by a screw 212 and being frictionally carried by the hub 207 of the arm 206, the friction between the hubs being adjustable by tightening or loosening the said screw.

For the purpose of releasably locking the bell-crank arms 205 and 206 together, the latter arm has a boss 213 projecting outwardly, the said arm and boss having a stepped bore 214, Fig. 14, accommodating a locking pin 215. Also, the arm 205 has a lateral extension 205a provided with an aperture 216 for receiving the end of the locking pin 215, and the latter is yieldably maintained in the locking position shown in Fig. 15 by a compression spring 217 carried in the bore 214 and engaging a shoulder 218 on the pin 215.

The boss 213 has in its end a pair of shallow diametric grooves 219, and also a second and deep pair of diametric grooves 220 at right angles to the grooves 219, and the locking pin 215 has a transverse positioning pin 221 by means of which it can be held in extended position wherein the tip portion does not engage the arm extension 205a, the arms 205 and 206 being thereby movable independently of each other except for the friction provided between the hubs 207 and 211 thereof.

In moving the locking pin 215 to extended non-locking position, the pin is grasped at its end 222 and pulled outwardly, and then rotated ninety degrees, whereupon the positioning pin 221 will be located for reception in the shallow grooves 219. The locking pin 215 is then released, and the spring 27 retracts the pin slightly so as to seat the positioning pin 221 in the grooves 219.

It will be appreciated that if the control device is to be operated from the remote control station 102, the locking pin 215 will be allowed to remain in the position shown in Fig. 14, wherein it locks together the arms 205 and 206 of the bell-crank 204. For such position, since no relative movement between the arms 205 and 206 is possible, the friction existing between the hubs 207 and 211 of the arms does not have any effect. If the device is to be set for proximal control, that is, control at the engine 11, the remote control lever 103 is set either in neutral, or "ahead idling" or "astern idling," and the locking pin 215 is pulled out, rotated ninety degrees and released. This enables the bell-crank arm 206 to be actuated by grasping and moving the knob 210. Such actuation is accompanied by the compensating action of the curved link 57 and compensating spring 58, so that finger-tip operation of the speed-control lever 20 of the governor may be had at the knob 210. The friction existing between the hubs 207 and 211 of the bell crank arms 205 and 206 now becomes effective to prevent creeping of the arm 206. This friction may be adjusted to a small value which does not defeat the finger-tip operation of the knob 210, yet creeping of the latter and the parts of the control connected with the speed-control lever 20 is effectively prevented. The prevention of the said creeping is accomplished by the bell-crank arm 205 acting as an anchorage, due in part to the inherent friction in the push-pull cable 41, and also in part to the detent action of the spring 125 and bell-crank 124 engaging the notches 126, 127 or 128 of the segment 123. Or, where the control device does not include control of the engine clutch, as when the remote control station 46 is employed, the anchorage is due in part to the friction device 62 engaging the segment 68.

It will be understood that in the normal operation of a marine craft, the assumption of control at the engine 11 will only be undertaken upon permission or orders from the bridge of the vessel, and at such time the control lever 103 of the station 102 will normally be so positioned that one of the three notches 126, 127 or 128 is being engaged by the detent bell-crank 124. If, however, through some unforeseen circumstance the control lever 103 is not in the position where the notches are being engaged, taking-over of the control at the engine 11, and operation of the knob 210 will, because of the friction between the hubs 207 and 211, cause rotation of the segment 123 until one of the three notches 126, 127 or 128 is engaged by the bell-crank 124, whereupon the segment 123 will be prevented from further movement and the friction between the hubs 207 and 211 will become effective to prevent creeping of the control.

Proximal operation of the shut-down control is provided for, according to the invention, by having in the mechanism 104 a bell-crank 94a with a manually operable arm 223, the said arm having a knob 224.

Referring to Fig. 8, actuation of the bell-crank 94a by grasping and moving the knob 224, which is located at the engine 11, will also drive the push-pull cable 87 and operate the knob 198, and the friction of the said cable and knob control will hold the lever 94a and the shut-down lever 20a in any adjusted position. Where the shut-down control is not provided with a remote operating means, as shown in Fig. 12, a helical coil spring 225 is mounted to encircle the hub of the bell-crank 94a, one end 226 of the spring being anchored to the arm 93, and the other end 227 of the spring being anchored by means of a screw 228 to the vertical plate 24. The spring 225 normally yieldably holds the bell-crank 94a in, and returns it to the position shown in Fig. 12, which is the "run" position of the shut-down.

By the use of the improved control device of the present invention, as adapted for both throttle and clutch control, it is possible to actuate the clutch mechanism of an engine from a point adjacent the latter and independently of the remote control, while the remote station is connected to actuate the speed-control member of the engine. Or, both the clutch and the speed-control members of the engine may be operated from the said remote point, or both may be operated independently of the remote control station and from a point adjacent the engine. The control device is thus found to be exceedingly flexible in its operation, and to have utility in various situations. For instance, where an engine develops an emergency condition such as a burned-out bearing etc., it is possible for the engineer located at the engine to immediately take over the controls and shut down the engine. Or, if a complete shut down is not indicated, the engineer may take over the throttle control alone and decelerate the engine.

The provision of the proximal control is also of advantage when warming up an engine, or if it is necessary to make adjustments of fuel, speed and the like, or to operate the generator driven by the engine. In the latter case, the engine speed may be conveniently adjusted to produce the correct generator voltage. Where the engine is employed in operating a winch it is often found advantageous to control the engine speed, shut down, etc., in the engine room.

The proximal shut-down control comprising the bell-crank 94a and manually engageable actuating knob 224, when used with the locking remote control mechanism shown in Fig. 7, has utility for marine use. For example, where such installation is made, it is impossible for the engineer at the engine to actuate the shut-down control unless the officer at the bridge first releases or unlocks the remote control station. Thus, positive assurance is had that the engine will not be shut down without permission from the bridge.

However, the mechanism shown in Fig. 7 need not be of the locking type, and this may be accomplished by merely changing the limits of movement of the segment 82 so that it comes to rest before reaching the upper and lower dead center positions, at least ten degrees from the said positions. In this case, the shut-down control is not interlocking, and the engine may be shut down either from the bridge by actuating the lever 79, or from the engine by actuating the lever 223. Where the knob-type of remote control fitting, such as illustrated in Figs. 8 and 11, is employed for engine shut down, a non-interlocking system is had also, since the engine may be shut down from either the bridge by actuating the knob 198, or from a point adjacent the engine by actuating the lever 223.

Variations and modifications may be made within the scope of this invention and portions of the improvements may be used without others.

I claim:

1. In a prime mover having a speed-control member requiring a force progressively increasing to move the same between two settings, actuating means for moving said member to a desired setting; a yieldable friction device for holding said actuating means in different adjusted positions; and means for automatically applying a force to said actuating means to substantially balance the said increasing force for positions of the member located between the said settings.

2. In a prime mover having a control device including a speed-control lever and means opposing movement of the lever with a progressively increasing force as the lever is moved between two settings, a compensating device for said lever, including means for automatically substantially balancing the said opposing force for positions of the lever located between the said settings, the said means including: a curved link; and means connecting one end of said link with the end of the lever, the link circumventing the pivot for the lever and having its other end located on the opposite side of the said pivot, and the said balancing means including an extension spring connected with the other link end, for exerting a pulling force on the link.

3. In a prime mover having a speed-control member opposed by a progressively increasing force as the member is moved between two settings, a compensating control device including means for automatically substantially balancing the said opposing force on the member during its said movement, said means comprising: a lever; means connecting the lever to the member to drive the same; anti-friction bearing means mounting the said lever; an extension spring; and means connecting said spring to the end of the lever and transmitting a force thereto which is directed generally toward the pivoting point of the lever during at least a part of the movement of the same.

4. In a prime mover having a speed-control member opposed by a progressively increasing force as the member is moved between two settings, a compensating control device including means for automatically substantially balancing the said opposing force on the member during its said movement, said means comprising; a lever; means connecting the lever to the member to drive the same; an extension spring; and means connecting one end of said spring to the end of the lever, the other end of the spring being anchored at a point such that a progressively increasing turning moment is applied to the lever during its movement.

5. In a remote control device for connection to the control member of a prime mover, a housing located at a point remote from the prime mover; a manually operable lever pivotally mounted in the housing; linkage means operable by the lever and connecting the said control member with the lever for operation thereby; a segment mounted in the housing to move with the lever; and means carried by the housing and bearing against the said segment for frictionally holding the latter and lever in any adjusted position, including means for locking the segment and lever in such position.

6. In a remote control device for connection to the control member of a prime mover, a housing located at a point remote from the prime mover; a manually operable lever pivotally mounted in the housing; linkage means operable by the lever and connecting the said control member with the lever for operation thereby; a segment mounted in the housing to move with the lever; means carried by the housing and bearing against the said segement for frictionally holding the latter and lever in any adjusted position, said means comprising a shoe engaging the segment, an adjustable screw in said housing carrying said shoe, and spring means between the shoe and screw; and means providing for direct driving engagement between the shoe and screw when the latter is advanced on the shoe and stresses the spring beyond a predetermined point, thereby to increase the shoe pressure on the segment sufficiently to lock the latter.

7. A control device for a prime mover having a speed-control member opposed by a progressively increasing force as the member is moved between two settings, said device comprising a base secured to the frame of the prime mover; a lever; anti-friction means for pivotally mounting the lever on the base; a linkage drivingly connecting the lever with the said speed-control member; a second lever movable about the pivot of the first mentioned lever, and rigidly secured to the latter, said second lever being longer than the first-mentioned lever; and means applying a progressively increasing assisting turning moment to the second lever as the levers are moved and drive the speed-control member, said means including a spring connected with the base and with the end of the second lever, and the said spring exerting a force on the second lever which is directed generally toward the pivoting point thereof during at least a part of the movement of the lever.

8. In a governor-controlled Diesel engine wherein the governor has a loading adjustment including a speed-controlling movable member which has imposed on it a progressively increasing opposing force as it is made to move toward full-speed position, a remote control device comprising a base secured to the engine frame; an intermediary drive member movably carried by the base; drive means coupling the said members together; a push-pull cable connected to operate the said intermediary drive member, said cable extending from the latter to a remote point; manually operable means at said remote point for operating the said cable; means connected with the base and intermediary drive member for progressively increasingly assisting the movement of the latter when it causes the speed-controlling member to move toward its full-speed position, thereby to balance the said force imposed on the speed-controlling member and remove the load on the push-pull cable; and a yieldable friction device for holding said manually operable means in every adjusted position.

9. In a governor-controlled Diesel engine wherein the governor has a loading adjustment including a speed-controlling movable member which has imposed on it a progressively increasing opposing force as it is made to move toward full-speed position, a remote control device comprising a base secured to the engine frame; a lever; anti-friction means pivotally mounting the lever on the base; drive means coupling the speed-controlling member and lever together; a push-pull cable connected to operate the lever, said cable extending from the latter to a remote point; a housing at said remote point; a manually operable lever pivotally mounted in the housing and connected with the remote end of the cable for operating the latter; a circular segment rigid with said manually operable lever; adjustable means carried by the housing and bearing against the segment for frictionally holding the latter and the manually operable lever in any adjusted position, including means for locking the segment and lever in such position; means connected with the base and lever carried thereby for applying a progressively increasing assisting turning moment to the latter as it is moved and causes the speed-controlling member to move toward full-speed position, thereby to oppose the force imposed on the said member and reduce the load on the push-pull cable; and means for adjusting the said means for applying a turning moment to the lever, to vary the value of the said turning moment.

10. In a prime mover having a clutch and having a speed-control member opposed by a progressively increasing force as the member is moved between two settings, a control device including a manually operable member connected to drive the speed-control member, and including compensating means coupled with the said speed-control member for automatically applying thereto a force tending to operate it and having substantially the same value as the said opposing force for positions of the member located between the said settings; and means for operating the clutch in response to movement of the manually operable member to and from a predetermined position wherein the speed-control member is located substantially at one of the said settings.

11. In a prime mover having a clutch and having a throttle or speed-control member opposed by a progressively increasing force as the member is moved between two settings, a control device including a manually operable member having a positive mechanical driving connection with the speed-control member, and including compensating means coupled with the said speed-control member for automatically applying thereto a force tending to operate it and having substantially the same value as the said opposing force for positions of the member located between the said settings; and power-driven means for operating the clutch in response to movement of the manually operable member to and from a predetermined position wherein the speed-control member is located substantially at one of the said settings.

12. In the prime mover of a marine craft, said prime mover having a reverse gear and having a speed-control member opposed by a progressively increasing force as the speed-control member is moved between two settings, a control device including a manually operable member having a positive mechanical driving connection with the speed-control member, and including compensating means coupled with the said speed-control member for automatically applying thereto a force tending to operate it and having substantially the same value as the said progressively increasing force for positions of the member located between the said settings; and power-driven means for operating the reverse gear in response to movement of the manually operable member to and from a predetermined position wherein the speed-control member is located substantially at one of the said settings.

13. In the prime mover of a marine craft, said prime mover having a reverse gear and having a speed-control member opposed by a progressively increasing force as the speed-control member is moved between two settings, a control device including a manually operable member having a positive mechanical driving connection with the speed-control member, and including compensating means coupled with the said speed-control member for automatically applying thereto a force tending to operate it and having substantially the same value as the said progressively increasing force for positions of the member located between the said settings; and high-speed power-driven means for operating the reverse gear in response to movement of the manually operable member to and from a predetermined position wherein the speed-control member is located substantially at one of the said settings, said power-driven means having a rapid response characteristic such that actuation of the reverse gear is completed in a fraction of a second.

14. In the prime mover of a marine craft, said prime mover having a reverse gear and having a speed-control member opposed by a progressively increasing force as the speed-control member is moved between two settings, a control device including a manually operable member movable in either of opposite directions from a neutral position to either of two limits, said manually operable member having a positive mechanical driving connection with the speed-control member, and advancing the latter from one setting to the other when the manually operable member is moved from its neutral position toward either limit, the said control device including compensating means coupled with the said speed-control member for automatically applying thereto a force tending to operate it and having substantially the same value as the said progressively increasing force for positions of the member located between the said settings; and power-driven means for operating the reverse gear in response to movement of the manually operable member to and from the said neutral position.

15. In a prime mover having a clutch and having a speed-control member opposed by a progressively increasing force as the speed-control member is moved between two settings, a control device including a manually operable member connected to drive the speed-control member, and including a compensating leverage and spring means coupled with the said speed-control member for automatically applying thereto a force tending to operate it and having substantially the same value as the said progressively increasing force for positions of the member located between the said settings; and means for operating the clutch in response to movement of the manually operable member to and from a predetermined position wherein the speed-control member is located substantially at one of the said settings.

16. In the prime mover of a marine craft, said prime mover having a reverse gear and having a speed-control member opposed by a progressively increasing force as the speed-control member is moved from a retarded or idling setting to an advanced setting, a control device including a manually operable member movable in either of opposite directions from a neutral position to either of two limits, said manually operable member having a positive mechanical driving connection with the speed-control member, and advancing the latter from the idling setting to the advanced setting when the manually operable member is moved from its neutral position to either limit, the said control device including compensating means coupled with the said speed-control member for automatically applying thereto a force tending to operate it and having substantially the same value as the said progressively increasing force for positions of the member located between the said settings; and power-driven means for operating the reverse gear for forward or reverse coupling of the propeller of the craft in response to movement of the manually operable member from the said neutral position respectively to either of the said limits, the said power-driven means disengaging the reverse gear upon return of the member to neutral position, and having a rapid response characteristic such that, together with the positive mechanical driving connection between the manually operable member and speed-control member, the latter when swiftly and without stopping is shifted from one limit through neutral to the other limit, reverses the propeller of the craft without stalling the prime mover, the reapplication of the load on the prime mover due to the said reversing occurring subsequent to return of the speed-control member to idling setting, and the speed-control member again reaching its advanced setting before the prime mover decelerated appreciably due to the said reapplication of the propeller load.

17. In a prime mover having a speed-control member opposed by a progressively increasing force as the member is moved between two settings, a control device comprising a manually-controlled movable member located at a point remote from the prime mover and coupled to the said speed-control member for driving the latter; compensating means located at the prime mover and connected to the speed-control member for progressively increasingly assisting its movement when being driven by the manually-controlled member; and a releasable coupling located at the prime mover and interposed between the manually-controlled member and the speed-control member for disconnecting the said members, the said coupling having manually engageable means for actuating the speed-control member, and the said compensating means being operative during release of the coupling and actuation of the speed-control member by the said manually engageable means.

18. In a prime mover having a speed-control member opposed by a progressively increasing force as the member is moved between two settings, a control device comprising a manually-controlled movable member located at a point remote from the prime mover and coupled to the said speed-control member for driving the latter, compensating means located at the prime mover and connected to the speed-control member for progressively increasingly assisting its movement when being driven by the manually-controlled member; a two-part manually releasable coupling located at the prime mover and interposed between the manually-controlled member and the speed-control member for disconnecting the said members, one of the parts of the said coupling having manually engageable means for actuating the speed-control member, and the said compensating means being operative during release of the coupling and actuation of the speed-control member by the said manually engageable means; and a friction device connected between the parts of the coupling, the said device being operative when the coupling parts are released from each other, and preventing creeping of the speed-control member upon the manually-controlled member being held immovable.

19. In a prime mover having a speed-control member opposed by a progressively increasing force as the member is moved between two settings, a control device comprising a manually-controlled movable member located at a point remote from the prime mover and coupled to the said speed-control member for driving the latter; compensating means located at the prime mover and connected to the speed control member for progressively increasingly assisting its movement when being driven by the manually-controlled member; a two-part manually releasable coupling located at the prime mover and interposed between the manually-controlled member and the speed-control member for disconnecting the said members, one of the parts of the said coupling having manually engageable means for actuating the speed-control member, and the said compensating means being operative during release of the coupling and actuation of the speed-control member by the said manually engageable means; a friction device connected between the parts of the coupling, the said device being operative when the coupling parts are released from each other, and preventing creeping of the speed-control member upon the manually-controlled member being held immovable, and the said friction device comprising a split sleeve on one of the coupling parts, and a hub on the other coupling part, engaging the said sleeve; and means for adjusting the diameter of the split sleeve to vary the friction of the said friction device.

20. In a prime mover having a speed-control member opposed by a progressively increasing force as the member is moved between two settings, a control device comprising a manually-controlled movable member located at a point remote from the prime mover and coupled to the said speed-control member for driving the latter; compensating means located at the prime mover and connected to the speed-control member for progressively increasingly assisting its movement when being driven by the manually-controlled member; and a releasable coupling comprising a bell-crank having relatively movable arms and having means for locking and releasing the arms, the said coupling being located at the prime mover and being interposed between the manually-controlled member and the speed-control member for disconnecting the said members, and the coupling having means for actuating the speed-control member, the said compensating means being operative during release of the coupling and actuation of the speed-control member by the said manually-engageable means.

21. In a prime mover having a clutch and having a speed-control member opposed by a progressively increasing force as the speed-control member is moved between two settings, a control device including a manually operable member connected to drive the speed-control member, and including compensating means coupled with the said speed-control member for automatically applying thereto a force tending to operate the member and having substantially the value as the said progressively increasing force for positions of the member located between the said settings; means for operating the clutch in response to movement of the manually operable member to and from a predetermined position wherein the speed-control member is located substantially at one of the said settings; means located at the prime mover for rendering the last-named means inoperative to actuate the clutch in response to movement of the manually operable member, the said clutch being operable at the engine independently of the said member; and a releasable coupling located at the prime mover and interposed between the manually movable member and the speed-control member for disconnecting the said members, the said coupling having manually engageable means for actuating the speed-control member, and the said compensating means being operative during release of the coupling and actuation of the speed-control member by the said manually engageable means.

22. In a prime mover having a speed-control member requiring a force progressively increasing to move the same between two settings, actuating means for moving said member to a desired setting; a yieldable friction device for holding said actuating means in different adjusted positions; means for automatically applying a force to said actuating means to substantially balance the said increasing force for positions of the member located between the said settings; and means connected with said friction device for locking the actuating means in adjusted position.

23. In a prime mover having a speed-control member requiring a force progressively increasing to move the same between two settings, actuating means for moving said member to a desired setting; a yieldable friction device for holding said actuating means in different adjusted positions; and means for automatically applying a force to said actuating means to substantially balance the said increasing force for positions of the member located between the said settings, said friction device providing a detent action which prevents movement of said actuating means in all adjusted positions thereof.

ERWIN J. PANISH.

REFERENCES CITED

The following references are of record in the file of this patent:

UNITED STATES PATENTS

| Number | Name | Date |
|---|---|---|
| 1,996,679 | Lepek | Apr. 2, 1935 |
| 2,190,257 | Clench | Feb. 13, 1940 |
| 2,240,091 | Cerne | Apr. 29, 1941 |
| 2,358,094 | Panish | Sept. 12, 1944 |